United States Patent
Conversy (10) Patent No.: US 10,579,508 B2
(45) Date of Patent: Mar. 3, 2020

(54) METHOD AND APPARATUS FOR PROCESSING CODE

(71) Applicant: ECOLE NATIONALE DE L'AVIATION CIVILE, Toulouse (FR)

(72) Inventor: Stéphane Conversy, Toulouse (FR)

(73) Assignee: ECOLE NATIONALE DE L'AVIATION CIVILE, Toulosuse (FR)

( * ) Notice: Subject to any disclaimer, the term of this patent is extended or adjusted under 35 U.S.C. 154(b) by 0 days.

(21) Appl. No.: 15/974,128

(22) Filed: May 8, 2018

(65) Prior Publication Data

US 2018/0329804 A1    Nov. 15, 2018

(30) Foreign Application Priority Data

May 15, 2017    (EP) ..................... 17305550

(51) Int. Cl.
| | | |
|---|---|---|
| G06F 9/44 | (2018.01) | |
| G06F 9/445 | (2018.01) | |
| G06F 11/36 | (2006.01) | |
| G06F 8/34 | (2018.01) | |

(52) U.S. Cl.
CPC ............ *G06F 11/3664* (2013.01); *G06F 8/34* (2013.01)

(58) Field of Classification Search
CPC ........... G06F 8/34; G06F 11/3664; G06F 8/38
See application file for complete search history.

(56) References Cited

U.S. PATENT DOCUMENTS

| | | | | |
|---|---|---|---|---|
| 7,493,544 | B2 * | 2/2009 | Blass | G06F 11/263 703/13 |
| 9,129,038 | B2 * | 9/2015 | Begel | G06F 8/74 |
| 2008/0263515 | A1 * | 10/2008 | Dellas | G06F 8/34 717/109 |
| 2010/0211924 | A1 * | 8/2010 | Begel | G06F 8/74 717/101 |
| 2013/0235040 | A1 * | 9/2013 | Jackson, Jr. | G06T 11/206 345/440 |

(Continued)

OTHER PUBLICATIONS

Alexandre Bergel, A Domain-Specific Language for Visualizing Software Dependencies as a Graph, 2014, pp. 45-49. https://ieeexplore.ieee.org/stamp/stamp.jsp?tp=&arnumber=6980212 (Year: 2014).*

(Continued)

*Primary Examiner* — Mongbao Nguyen
(74) *Attorney, Agent, or Firm* — Meagher Emanuel Laks Goldberg & Liao, LLP (57) ABSTRACT

A mechanism for interacting with code such as software code is provided, whereby the code is represented as a graph such as a finite state machine corresponding to the code, such that a user may define a path through the code for example by way of a gesture or cursor movement, and the representation of the graph being restructured to give prominence to the nodes belonging to the defined path, and their sequence as defined in the path. The underlying code associated with each node may be presented with each corresponding node, so that the code of the nodes in the path is aligned, and can be read through as a continuous text. Amendments made to the code as presented can be reintegrated, and the representation adjusted as necessary.

6 Claims, 8 Drawing Sheets

(56) References Cited

U.S. PATENT DOCUMENTS

| | | | |
|---|---|---|---|
| 2014/0115566 A1* | 4/2014 | Cao | G06F 9/4498 |
| | | | 717/129 |
| 2014/0189652 A1* | 7/2014 | Gounares | G06F 11/3664 |
| | | | 717/125 |
| 2014/0359558 A1* | 12/2014 | Chamberlain | G06F 8/34 |
| | | | 717/105 |
| 2015/0363305 A1* | 12/2015 | Guan | G06F 11/3688 |
| | | | 717/132 |
| 2016/0291942 A1* | 10/2016 | Hutchison | G06F 8/451 |
| 2016/0350084 A1* | 12/2016 | Waggoner | G06F 8/34 |
| 2016/0357496 A1* | 12/2016 | Thimbleby | G06F 3/1454 |
| 2016/0371168 A1* | 12/2016 | Chatty | G06F 8/34 |
| 2017/0060541 A1* | 3/2017 | Saleh | G06F 8/34 |
| 2017/0109933 A1* | 4/2017 | Voorhees | G06F 17/2241 |
| 2017/0161027 A1* | 6/2017 | Singh | G06F 16/9024 |
| 2017/0277516 A1* | 9/2017 | Grebnov | G06Q 10/06 |
| 2017/0286104 A1* | 10/2017 | Abadi | G06F 8/433 |
| 2018/0011694 A1* | 1/2018 | Al-Fuqaha | G06F 8/34 |
| 2018/0157579 A1* | 6/2018 | Rozenberg | G06F 11/3612 |
| 2018/0173503 A1* | 6/2018 | Ghasemizadeh | G06F 8/34 |
| 2018/0314496 A1* | 11/2018 | Moody | G06F 8/24 |
| 2019/0028360 A1* | 1/2019 | Douglas | H04L 41/145 |

OTHER PUBLICATIONS

Fang-Hsiang Su, Code Relatives: Detecting Similarly Behaving Software, 2016, pp. 1-13. http://www.cs.columbia.edu/~simha/preprint_fse16.pdf (Year: 2016).*

European Search Report for 17305550.0 dated Aug. 7, 2017.

Arzen K-E: "Graphical languages for intelligent process control applications", Intelligent Control/Intelligent Systems and Semiotics, 1999. Proceedings of the 1999 IEEE International Symposium on Cambridge, MA, USA Sep. 15-17, 1999, Piscataway, NJ, USA, EEE, US, Sep. 15, 1999 (Sep. 15, 1999), pp. 219-224.

* cited by examiner

METHOD AND APPARATUS FOR PROCESSING CODE

FIELD OF THE INVENTION

The present invention relates to code processing, and in particular review and editing of code.

BACKGROUND OF THE INVENTION

In the sense of the field of discrete mathematics, a "graph" is a structure comprising a number of objects, or "nodes" whose interrelations are reflected by edges. A variety of conventional graphical representations of such graphs are known, with variations appearing in the different contexts in which such graphs are used. Examples of graphs include flow charts, finite state machines, computer network diagrams and even public transport plans.

These graphs tend to become more and more complex, so that effective presentation and review can become a challenge.

It is desirable to provide improved tools for manipulating graphs.

SUMMARY OF THE INVENTION

In accordance with the present invention in a first aspect there is provided an apparatus for processing code susceptible of graphical representation. This apparatus comprises an encoder adapted to generate a representation of the code as a graph and to cause the presentation of a graphical representation of the graph. The apparatus further comprises an input interface adapted to receive user input specifying a sequence through a series of selected nodes of the graph. The encoder is further adapted to cause the presentation of a graphical representation of the graph restructured so as to represent each respective selected node adjacent another respective selected node such that the selected nodes are arranged in the order corresponding to the sequence responsive to the user input.

In a development of the first aspect, the code is software code, the graph is a finite state machine representation corresponding to the software code, and each node is a state of the finite state machine representation.

In accordance with the present invention in a second aspect there is provided a method of processing code susceptible of graphical representation. This method comprises the steps of:
preparing a representation of the code as a graph,
presenting a graphical representation of at least a part of the graph,
receiving user input specifying a sequence through a series of selected nodes of the graph, and
presenting a graphical representation of at least part of the graph restructured so as to represent each respective selected node such that the selected nodes are arranged in the order corresponding to said sequence.

In a development of the second aspect, the code is software code, the graph is a finite state machine representation corresponding to the software code, and each node is a state of the finite state machine representation.

In a further development of the second aspect, the selected nodes are arranged vertically in the order corresponding to the sequence responsive to the user input.

In a further development of the second aspect, the graphical representation of the graph comprises the representation of the nodes of the graph as discrete entities in a display space, and the user input takes the form of a path through the display space.

In a further development of the second aspect, the sequence is taken to comprise all nodes corresponding to a discrete entity lying within a predetermined proximity of the path.

In a further development of the second aspect, the method comprises the further step of comparing the sequence to the legal sequences of nodes defined in the graph, and adopting whichever legal sequence is the closest match to the specified sequence.

In a further development of the second aspect, the step of comparing comprises the additional step of determining a distance of each said node in the legal sequence from the path, and adopting as the specified sequence whichever legal sequence implies the smallest average distance from the path.

In a further development of the second aspect, the method comprises the further steps of retrieving a text representation of some or all of the nodes selected for display and/or belonging to the sequence, and displaying the text representations.

In a further development of the second aspect, the method comprises the further steps of retrieving the part of the code corresponding to of some or all of the states selected for display and/or belonging to the sequence, and displaying the corresponding code.

In a further development of the second aspect, the sequence additionally specifies one or more transitions of the graph corresponding to selected edges between one or more selected nodes.

In a further development of the second aspect, the method comprises the further steps of receiving further user input specifying an amendment to the code, and adapting the representation of the code as a graph and the graphical representation of the graph to reflect the amendment.

In accordance with the present invention in a third aspect there is provided an apparatus adapted to implement the second aspect.

In accordance with the present invention in a fourth aspect there is provided a computer program adapted to implement the second aspect.

BRIEF DESCRIPTION OF THE DRAWINGS

The above and other advantages of the present invention will now be described with reference to the accompanying drawings, for illustration purposes only, in which.

DETAILED DESCRIPTION

While the present invention is applicable to any type of graph, representing any type of set of objects for example as discussed above, the following detailed embodiments will be presented by way of example in the context of software code. Those of skill in the art will recognize that similar hardware implementations are also possible.

The tools and methodologies associated with software code editing in general have evolved over time in parallel with the evolution of the computer systems used to implement the resulting code. While in the era of punch cards, programs were developed on paper, with the availability of terminals it became feasible to develop software code directly in the computing environment. Since then, programming has largely revolved around editing text based code, in general purpose text editing software, or increasingly over time in a dedicated Integrated Development Environment, generally offering additional tools for generating, compiling and debugging the code.

More specifically, programmers rely on Integrated Development Environment (IDEs) to visualize, understand, edit and test code. These tools range from simple text editors to edit program with textual languages (e.g. vi, emacs, Eclipse™ to edit C, C++ or Python™ programs) to graphical editors to edit program with visual programming languages (e.g. box and arrows to edit State Machines or Petri Nets).

Such editors may use multiple kinds of view to represent editable code. For instance, a tool like Eclipse allows display of the code in a textual window, and the hierarchy of classes in a tree view on the left of the global application window.

The canonical textual representation of imperative code consists in displaying lines of text stacked in a vertical manner, that is to say, arranged sequentially from top to bottom with reference to the display orientation from the user's point of view, with the events occurring earlier appearing nearer the top. For the remainder of the description embodiments will be described in the context of this top to bottom structure, corresponding to the conventional presentation of code in software development environments (as well as the conventional structure of written text generally in certain societies) although embodiments may equally cover sequential arrangements in any direction, including bottom to top, left to right, right to left, along an arc or arbitrary curve, or any other linear arrangement. The sequence of instructions that the machine executes is specified by the order along the descending Y dimension of the screen. Thus, in order to understand the behaviour of a textual imperative program, programmers can follow the instruction flow specified by the textual instructions. They look at a particular line, and go down, one line by one line, to get an idea of what the sequence of instructions is. This is easy to do since the next instruction is (1) close to the previous one (just under it), and is (2) horizontally aligned (indented) to facilitate visual grouping and scanning of the texts.

Certain environments support visual coding, in which a user may edit code by the manipulation of graphical representations of code entities in some computer generated spaces. Both text based and visual programming environments tend to present code with a structure built around a number of modules, with the elements in each module being presented in the sequence in which they will be executed subject to any loops and forks within the module.

The design of current programming tools is based on an implicit choice that consists in displaying code in a single, canonical representation. The textual canonical representation of interactive code consists of displaying the leaving transitions in the context of a state. However, in order to understand the behaviour of a sequence of events, it is sometimes necessary to look at the code of the transitions that led to the particular state currently investigated. This requires the programmer to find the transitions by scanning all the code, and once found, hop from transition to transition to understand the sequence of instructions.

A difficulty arises in reading, updating, testing and debugging code prepared using prior art interfaces since for a reader viewing the current line of code under execution, there is no indication what preceding steps led execution to arrive at that point. There are generally many possible paths through a particular piece of software, and these will in many cases not all be immediately apparent on inspection.

Generally speaking, interactive computer software can be represented in terms of a Finite State Machine. A Finite State Machine is a representation of a process in terms of a machine having a number of defined states, whereby at any time the machine must be in one, and only one of these states, and where states are linked by defined transitions, whereby movement between states can only occur in accordance with one of these defined transitions. As such, a finite state machine is an example of a graph, where the nodes of the graph correspond to the states of the machine, and the edges defining interrelations between the nodes are the transitions between the states.

The canonical representation of interactive code with states machines consists in drawing circles for states and arrows for transitions. The code triggered when crossing a transition sit next to the arrow of that transition.

Figure 1:
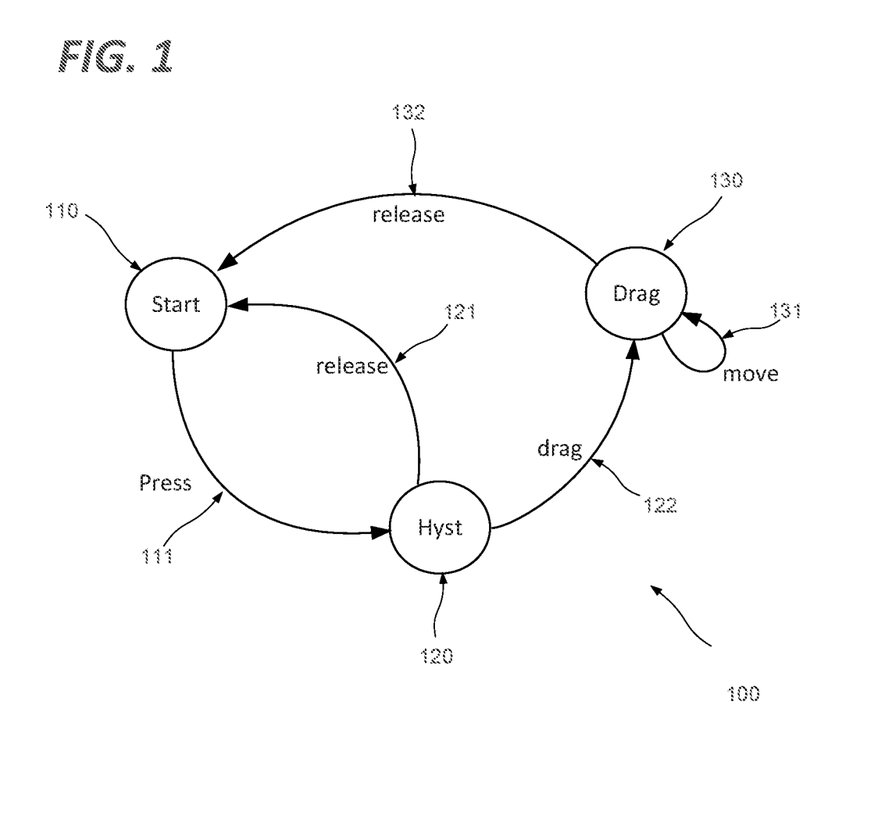
FIG. 1 shows an example of a Finite State Machine representation.

FIG. 1 shows an example of a Finite State Machine.

As shown in FIG. 1, there is provided a Finite State Machine 100 representing a user interface interaction feature. The states "Start" 110, "Hyst" 120 and "Drag" 130 are defined. The "Start" state has a transition "Press" 111, which leads to the state "Hyst" 120. The state "Hyst" 120 has a transition "Release" 121, which leads back to the state "Start" 110, and a transition "Drag" 122, which leads to the state "Drag" 130. The state "Drag" 130 has a transition "Move" 131, which loops back on the state "Drag" 130, and a transition "Release" 132, which leads back to the state "Start" 110. Accordingly, this state machine represents the common "drag and drop" behaviour frequently associated with Icons and other entities in graphical user interfaces. Specifically, when the user uses a cursor device such as a mouse pointer to click on such an entity, for example by moving the pointer over the entity and depressing the left mouse button, the press transition occurs for that entity bringing its state to "Hyst". If the user then releases the mouse button, the transition "Release" occurs and the state of the object returns to "Start". If on the other hand the user moves the mouse by a given distance without releasing, the Drag transition occurs shifting the entity's state to "Drag". Further movement leaves the entities state at "Drag", until the user releases the mouse button, triggering the "Release" event and returning the state to "Start".

Although most programming languages do not directly define Finite State Machines, it is generally possible to define an equivalent finite state machine representation for a computer program.

It will be appreciated with regard to the issue highlighted above that a formulation in terms of a Finite State Machine has the benefit of rendering explicit the possible paths for arriving at a particular point in the code. This property may be used to facilitate software development, coding, updating, debugging and the like. However, it may remain difficult to follow the flow of instructions with the eye since the programmer is required to hop from circle to circle by following the sequences of arrows, which unlike conventional text based code do not respect the general downward flow as execution proceeds.

For example in the case of FIG. 1, the programmer might want to fix a bug that occurs when a user of that program performs a particular sequence of events. Such sequence of events is supposed to trigger a sequence of the instructions associated with the transitions in question. In order to effectively analyse the sequence of instructions, the programmer has to retain the sequence of events in memory, determine the initial state, follow the transitions according to the first event of the sequence of events, read the code associated to a transition, memorize it, go to the next state, follow the transition corresponding to the next event, read and understand the code associated to this transition in the context of the code of the previous transition and so on. This requires more cognition devoted to flow scanning, at the expense of the cognition required to understand the code.

The invention solves this problem by providing an interaction that aligns the sequence of instructions in order to facilitate reading by the programmer.

As such, it is proposed to display and animate a transition between the current layout of the representation of the code to a new layout specified by the user, or automatically specified according to a set of criteria. A user interaction and a representation technique are described below, enabling a programmer to better understand interactive code.

Figure 2:
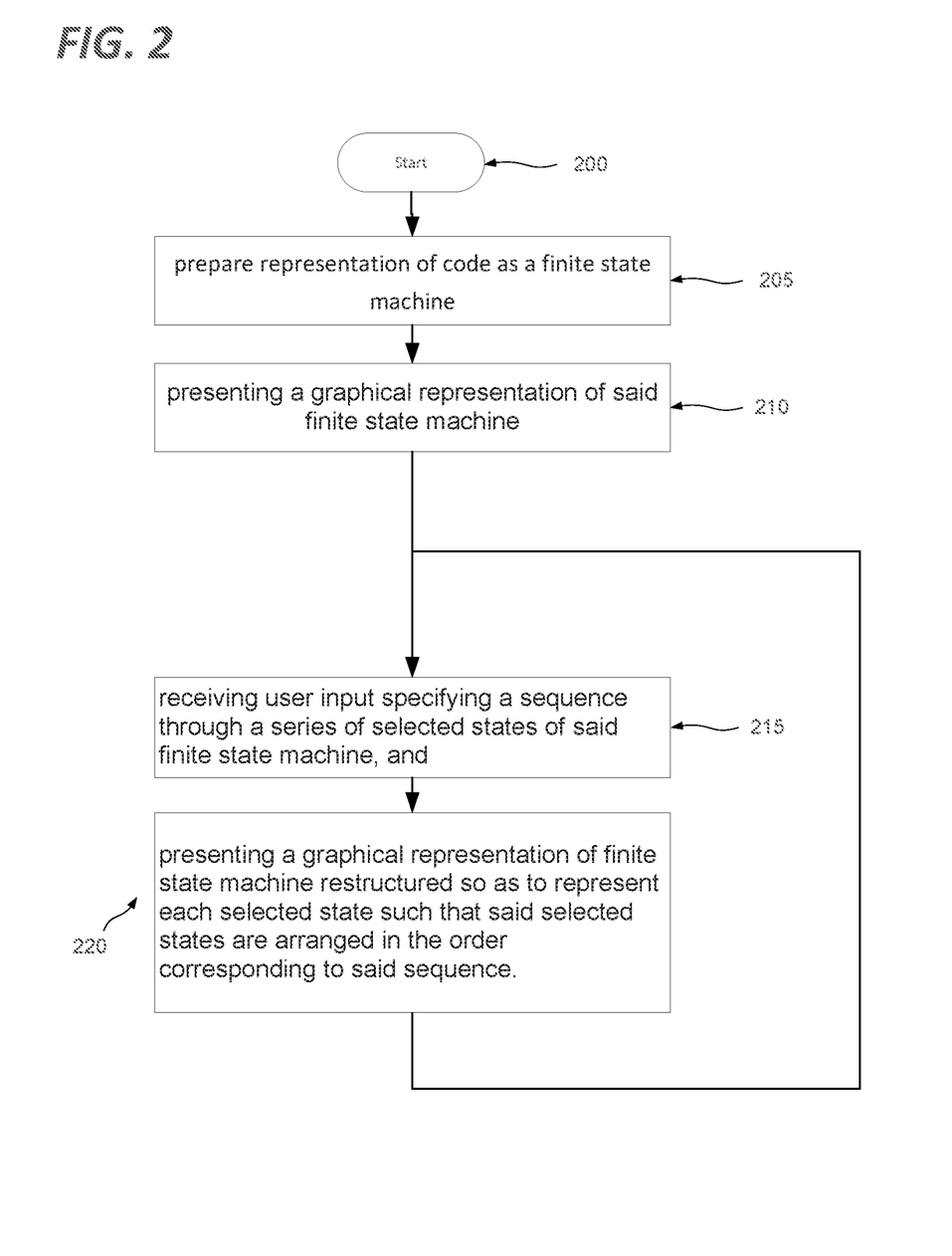
FIG. 2 shows a method in accordance with an embodiment.

FIG. 2 shows a method in accordance with an embodiment. As shown in FIG. 2, there is provided a method of processing code. The method starts at step 200 before proceeding to step 205 at which a representation of the code is generated as a graph. In a case where the code constitutes software code, the representation may be prepared by conversion of the conventional software code, for example as implemented by the SwingStates library. Alternatively, the code may exist in a natively Finite State Machine representation. Still further, code may reflect or define the operation of a hardware device, or a system comprising an mixture of hardware or software elements. Still further, the system may comprise a plurality of devices operating together. For example, embodiments may be well adapted to an "Internet of Things" context, for instance in "If This Then That" (IFTTT) situations, which may be expected to become more complex as this field develops. Once again, this device or system may operate explicitly as a Finite State Machine, providing a ready mapping between its operation and the Finite State Machine representation, or otherwise.

The method next proceeds to step 210 at which a graphical representation of at least a part of the graph is presented. By way of example, a library such as The Boost Graph Library (BGL) may be used to generate a graphical representation of the Finite State Machine representation of the code. This presentation may be by means of any type of display device as discussed below, and may be two or three-dimensional. While in the case of simple programs it may be possible to present the entire graph at once, more generally it may be necessary to select only a part of the graph for display. This selection may involve the identification of a current node, for example as specified by a user or determined on the basis of the current state of a program presently under execution (for example in a break condition) in a case where the code is software code, and the incorporation of all nodes and edges related to that current node.

Optionally the graphical representation of the graph may comprise the representation of the nodes of the graph as discrete entities in a display space.

The method next proceeds to step 215 at which user input specifying a sequence through a series of selected states of the finite state machine representation is received.

In a case where the graphical representation of the graph comprises the representation of the nodes of the graph as discrete entities in a display space, the user input may take the form of a path through the display space. This path may conveniently be defined by the user by means of a stylus or finger on a touch screen or touch pad, or a cursor or pointer movement as controlled by a mouse, trackerball, finger tracker, hand tracker, gesture tracker, eye tracker or the like.

It will be appreciated that the paths selected by the user may tend to constitute common, preferred, or problematic sequences of nodes, and, as such, it may prove beneficial to record the paths specified by the user for future reference. Default presentations of the graph may be determined on the basis of the most common, or average paths defined by the user, such that these paths are preferentially presented for rapid and intuitive reading.

The method next proceeds to step 220 at which a graphical representation of at least part of said graph is presented in restructured form so as to represent each selected node such that the selected nodes are arranged in the order corresponding to the sequence. The method may then loop back to step 215.

By restructuring the representation in this way, it becomes possible to dynamically represent the relevant parts of the graph in a manner whose readability approaches and in some regards surpasses that of the top-to-bottom representation of text-based code.

In a case where the graphical representation of the graph comprises the representation of the nodes of the graph as discrete entities in a display space and the user input may take the form of a path through the display space, the sequence in which the nodes are presented may correspond to the order in which they are passed through by the path.

In other cases, the sequence in which the nodes are presented may correspond to or be influenced by the order in which the nodes passed through by the path may occur during execution, for example as defined by the edges of the graph and, as applicable, their direction. As such, there may be provided an additional step of analyzing the legal order of execution of the sequence. In some cases the specification of an illegal sequence may raise a flag, provoke an error message and/or simply terminate the method. Alternatively, there may be provided an additional step of identifying the most probable order of execution of the nodes in question, and reordering the sequence accordingly. Still further, there may be provided an additional step of excluding illegal, or irrelevant nodes from an otherwise legal sequence.

It will be appreciated that the user may not wish to or be able to trace an exact path through the centre of each of the entities defining nodes in the graph, in particular in complex and dense representations. Accordingly, there may be provided an additional step of identifying the discrete entity lying within a predetermined proximity of the path in the display space, and considering the sequence to comprise all nodes corresponding to a discrete entity lying within a predetermined proximity of the path. For example, it may be considered that all entities whose centre, handle, or border lies within a predefined number of pixels of the path are considered to belong to the sequence. Alternatively, the path itself may be considered to have a predefined width, such that all entities either wholly or in other embodiments partially within the path are considered to belong to the sequence.

In some cases it may be that a particular path may be considered to designate a number of possible sequences. Accordingly, there may be provided an additional step of comparing the sequence to the legal sequences of nodes defined in the graph, and adopting whichever said legal sequence is the closest match to the user input as said specified sequence. In addition to the purely technical considerations of the legal sequences possible within a particular finite state machine, the method may additionally determine a distance of each node in each possible legal sequence from the path, and adopt as the specified sequence whichever legal sequence implies the smallest average distance from the path.

Figure 3:
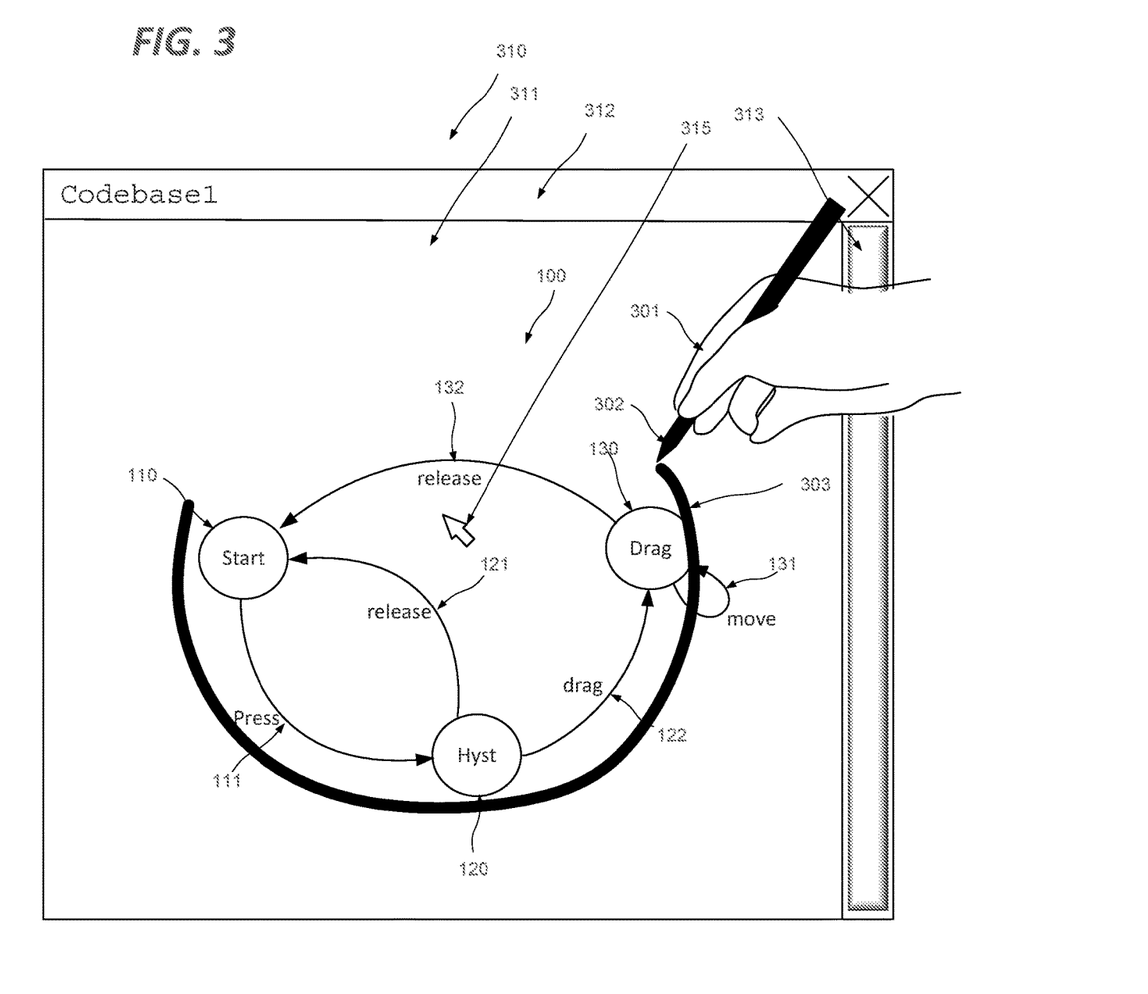
FIG. 3 shows a representation of a graphical representation environment in accordance with an embodiment in an initial state.

FIG. 3 shows a drawing of a graphical representation environment, in accordance with an embodiment, in an initial state. In this embodiment, the environment is shown by way of example as a software development, where the code is software code, represented in the form of a finite state machine representation. More particularly, FIG. 3 may be seen as representing an implementation of the embodiment of FIG. 2 at step 215 as described above. As shown in FIG. 3, there is provided a window 310 in a graphical user interface, which may constitute part of an Integrated Development Environment. As shown the window 310 comprises an editing pane 311, title bar 312, slider bar 313 and pointer 315 as examples of typical GUI interface features. The editing pane 311 displays a graphical representation of a graph 100 as discussed above.

Furthermore, FIG. 3 illustrates the definition of a path in accordance with certain embodiments. There is provided a graphical representation of a graph 100 identical to that described with respect to FIG. 1. Furthermore, there is shown a users hand 301 using a stylus 302 to describe a path 303, which passes in turn past states 110, 120 and 130.

In this example, the code is initially represented with a canonical 2D representation of a state machine: circles for states connected with arrows for transitions as described above with reference to FIG. 1. The programmer/user draws a path with the mouse or the stylus or any similar device by crossing through a number of states/circles, and possibly by following transitions. As such the drawn path specifies a sequence of states.

Figure 4:
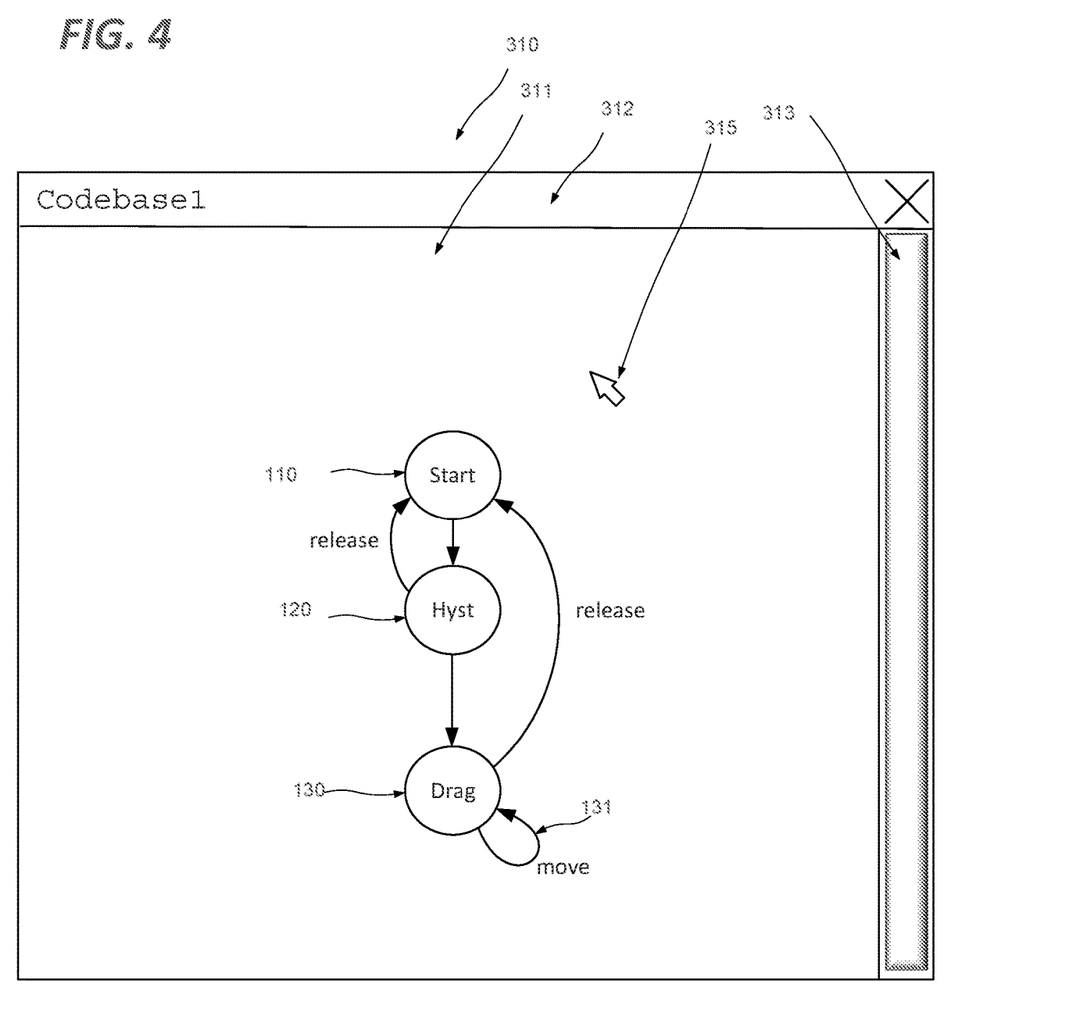
FIG. 4 shows a representation of a graphical representation environment in accordance with an embodiment in an advanced state.

FIG. 4 shows a representation of a graphical representation environment in accordance with an embodiment in an advanced state. More particularly, FIG. 3 may be seen as representing an implementation of the embodiment of FIG. 2 at step 220 as described above. Specifically, at the end of the user's gesture as described with reference to FIG. 3, a restructured graphical representation of the finite state machine is presented so as to represent each of the states selected by the user interaction such that said selected states are arranged in the order corresponding to the sequence. Accordingly, as shown State 110 is now at the top of the representation, followed by state 120, and finally state 130. Consequently, the user can "read" the default progression through the states (as defined by the order in which he or she traced the stylus through the states) from top to bottom in a similar manner as used to read "conventional code".

Optionally, the transition from the view of FIG. 3 to the view of FIG. 4 may be implemented by means of an animation moving the selected states progressively to their new positions.

In order to perform these steps, an internal representation of the program may be used. The internal representation may be based on components in memory, which are linked together by pointers to memory. Though the overall structure is an arbitrary graph, such internal representations are conceptually close to an Abstract Syntax Tree (AST) i.e. the result of the parsing of a code representation that allows a compiler to output runnable code. A representation in an IDE can be considered as a mapping between the components of the AST. The claimed solution may use the type of the internal component to adequately represent it to the user (e.g. a state represented by a circle, a transition by an arrow). In the above example, the device computes the new positions of the representation of each component so that they are aligned, then modify those positions gradually so that they interpolate between the initial value to the target value. The semantic of the program is thus unmodified, while the representation is more efficient to convey meaningful, less cognitively demanding information to the user/programmer.

As mentioned above, graphs can generally be defined in terms of code. Although traditionally Finite State Machines are represented by means of drawings such as described above with respect to FIG. 1, certain text based conventions do exist for the definition of Finite State Machines. In particular, SwingStates as presented in the article by Caroline Appert and Michel Beaudouin-Lafon. 2006 in the article entitled "SwingStates: adding state machines to the swing toolkit" in *Proceedings of the 19th annual ACM symposium on User interface software and technology* (UIST '06). ACM, New York, N.Y., USA, 319-322, proposes a set of rules for defining Finite State Machines in Java, using a class to represent each State Machine, and Anonymous classes. Each State is an Object belonging to a respective Anonymous Class, itself belonging to the State Class stored in a field of the State Machine, and each transition for a particular state is an object belonging to a respective Anonymous Class, itself belonging to the Transition Class stored in a field of the corresponding state.

The following text is a representation of the Finite State Machine of FIG. 1, in accordance with the SwingStates formalism:

```
CStateMachine sm = new CStatemachine (canvas)
    CElement toMove = null;
    Point2D lastPoint = null;
public State start = new State ( ) {
    Transition press = new PressOnShape (BUTTON1, ">> hyst") {
        public void action( ) {
            toMove = get Shape ( ) ;
            toMove = highlight ( ) ;
            lastPoinc = getPoint ( ) ; }}} ;
public State hyst = new State ( ) {
    Transition drag = new Drag (BUTTON1, ">> drag") {
        public boolean guard( ) I
            Point2D newPoint = getPoint ( ) ;
            return ! (newPoint.distance(lastPoint ) < 25) ; }
        public void action( ) {
            toMove.translateBy(getPoint( ).
            difference(lastPoint)) ;
            lastPoint = getPoint ( ) ; }} ;
    Transition release = new release (BUTTON1, ">> start") {
        public void action( ) {
            toMove = getShape( ) ;
            toMove.unhighlight( );}}};
public State drag = new State( ) {
    Transition move = new Drag(BUTTON1) {
        public void action( ) {
            toMove.translateBy(getPoint( ).
            difference(lastPoint));
            lastPoint = getPoint( );}};
```

```
Translation release= new Release (BUTTON1,
">> start") {
    public void action( ) {
        toMove = getShape( );
        toMove. unhighlight( );}}};
};
```

Accordingly, this code defines a drag and drop interaction with hysteresis.

Figure 5:
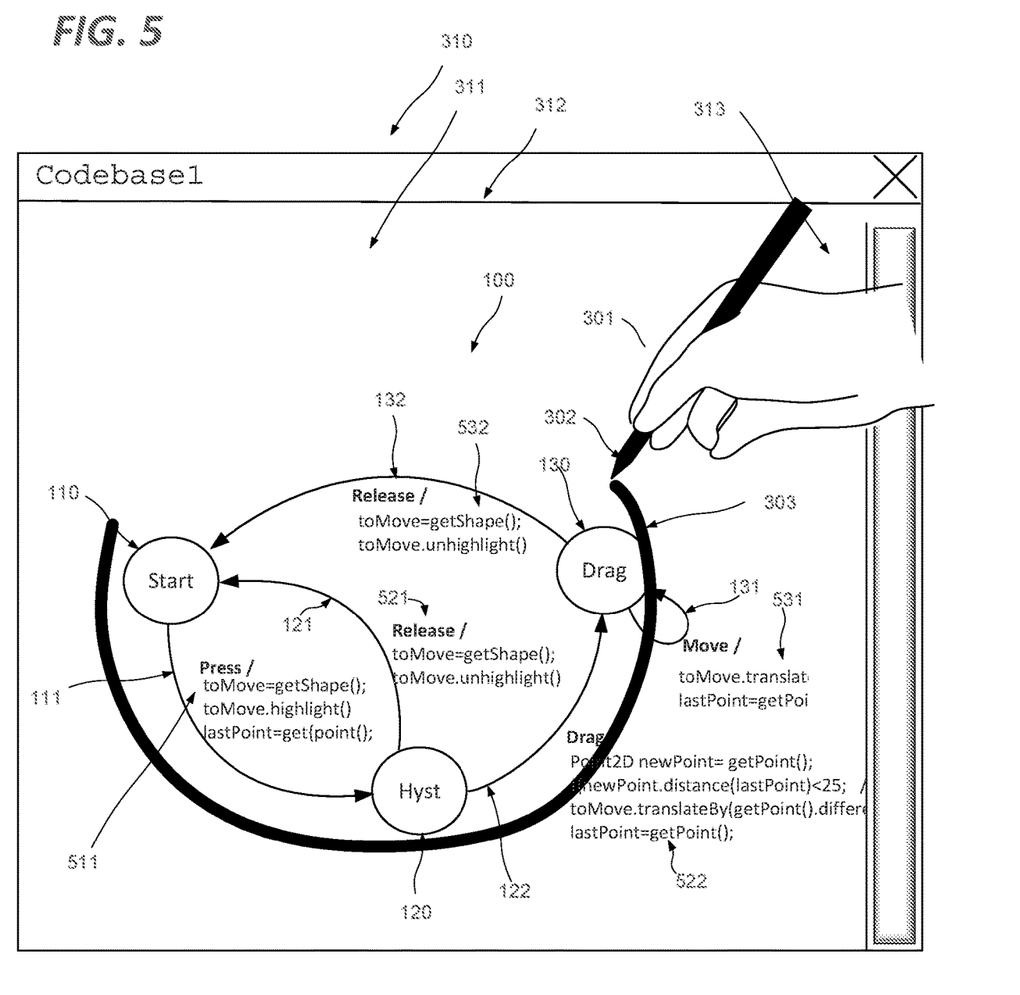
FIG. 5 shows a representation of a graphical representation environment in accordance with a further embodiment in an initial state.

FIG. 5 shows a representation of a graphical representation environment in accordance with a further embodiment in an initial state. As shown in FIG. 5, each of the representations of each of the transitions 111, 121, 122, 131, 132 as described above is associated in the window 310 with corresponding code text defining the respective transition, for example as might be derived from the example code presented above. Specifically, as shown the Press transition 111 is associated with the text block 511 containing the code:

```
toMove=getShape( );
toMove.highlight( )
lastPoint=get{point( );
```

Similarly, the Release transitions 121 and 132 are associated with the text blocks 521 and 532 respectively, each containing the code:

```
toMove=getShape( );
toMove.unhighlight( )
```

Similarly the Drag transition 122 is associated with the text block 522 containing the code:

```
Point2D newPoint= getPoint( );
!(newPoint.distance(lastPoint)<25;
toMove.translateBy(getPoint( ).difference(lastPoint));
lastPoint=getPoint( );
```

Finally the Move transition 131 is associated with the text block 531 containing the code:
toMove.translateBy(getPointo.difference(lastPoint));
lastPoint=getPoint( );

While presenting the code associated with each transition in this manner may well be of help to a programmer seeking to understand the detailed operation of the Finite State Machine, the addition of text in this matter may often increase the density of information presented to the user in a manner which may make initial assimilation more difficult.

In certain variants, the code or other information associated with a given node or edge may be displayed selectively, for example on the basis of explicit user selection, implicit user selection (for example if the mouse cursor, pointer or user gaze is focused on or in a predetermined proximity to that node), contextually (for example when the current state of execution is at a particular node), or otherwise.

Although described in the context of software code represented as a finite state machine, it will be appreciated that other graph representations of software code may be envisaged. Furthermore, it will be appreciated that any arbitrary graph may be processed as described above, in which case the code may comprise a graphical description language such as PostScript, SVG or the like.

Figure 6:
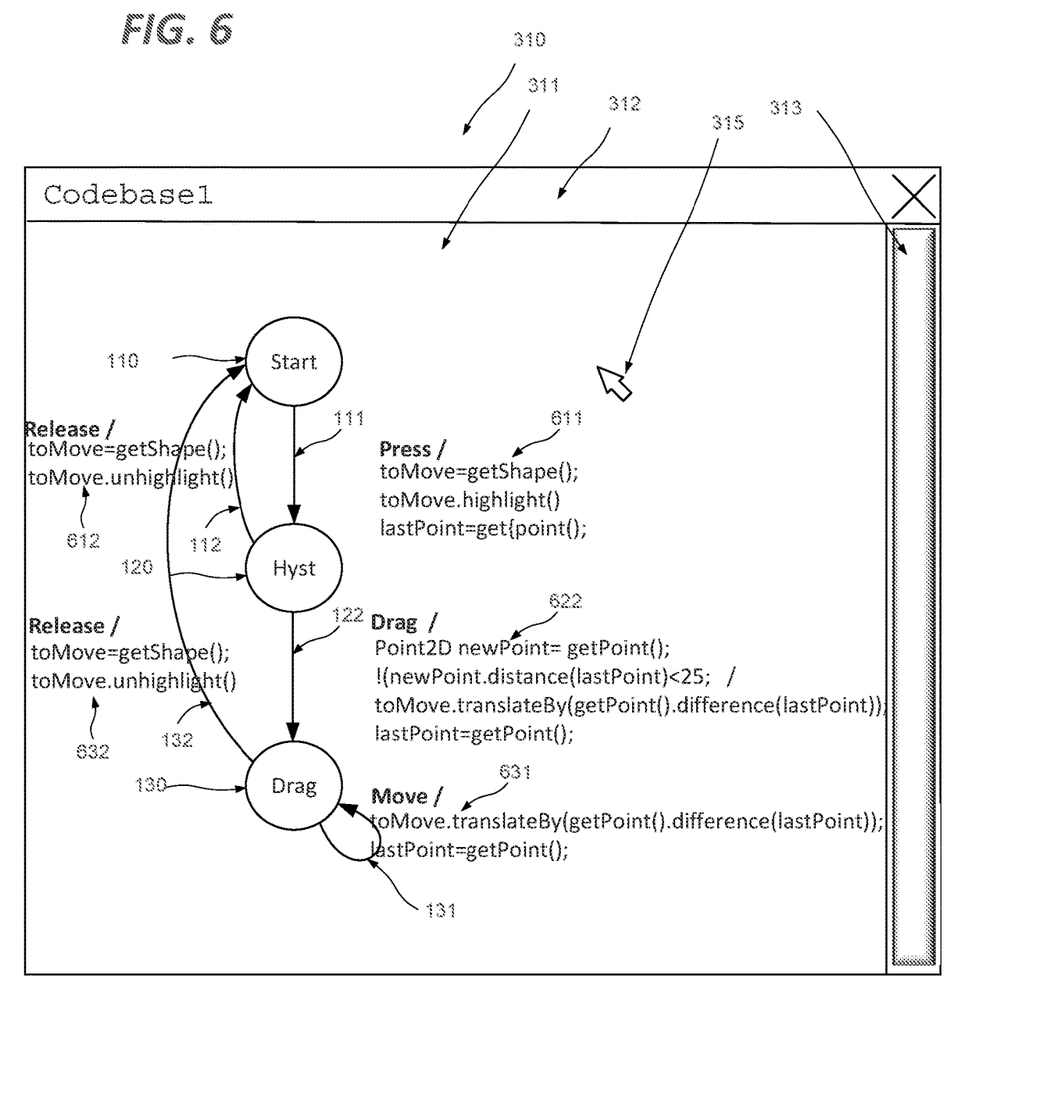
FIG. 6 shows a representation of a graphical representation environment in accordance with a further embodiment in an advanced state.

FIG. 6 shows a representation of a graphical representation environment in accordance with a further embodiment in an advanced state. FIG. 6 shows a variant of the embodiment of FIG. 4. As shown in FIG. 6, each of the representations of each of the transitions 111, 112, 122, 131, 132 as described above is associated in the window 310 with corresponding code text 611, 621, 622, 631, 632 defining the respective transitions, in a similar same manner to that described with reference to FIG. 5. Meanwhile, the States 110, 120 and 130, and their respective transitions have been repositioned as described with reference to FIG. 4.

Accordingly, the graphical representations of some or all of the nodes and/or transitions selected from the graph for display may be accompanied by the corresponding text version of the nodes and/or edges for example as described in the preceding passage. As such, there may be defined the further steps of retrieving the text representation of some or all of the nodes selected for display and/or belonging to the sequence, and displaying those text representations.

Still further, as shown, the text associated with the transitions belonging to the path defined by the user in FIGS. 3 and 5, that is, transitions 111, 122 and 131, have been re-aligned so as to represent a continuous vertical set of blocks of text, making it possible for the user to read through the transitions corresponding to his selected path in a clearly presented sequence. In this way, the presentation of information is reorganised and advantageously simplified to emphasise and prioritise the sequence through the Finite State Machine of particular interest to the user as expressed by his definition of the path.

Where a text representation is presented in this manner, the interface may allow further user input specifying an amendment to the text representation. Additionally where this is the case, the underlying graph, its graphical representation, and where applicable the code itself, may be adapted to reflect the amendment.

In some cases, for example where the code itself natively corresponds to a Finite State Machine, or where a clear mapping between parts of the underlying code and corresponding States or Transitions exists, it may furthermore be possible to accompany the graphical representations of some or all of the nodes and/or edges selected from the graph for display with the corresponding code. Where code is presented in this manner, the interface may allow further user input specifying an amendment to the code. Additionally, when appropriate, the graph (and its graphical representation) representing the code may be adapted to reflect the amendment.

While the foregoing examples focus on the selection of nodes, it will be appreciated that the same approach can extend in a similar way to the selection of edges. While often the selection of two adjacent nodes will implicitly also define the edge between those states, in some cases it may be desirable to provide for the explicit selection of edges as well as nodes. For example in some cases more than one edge may exist between a given pair of nodes, in which case the user may wish to specify which is to be given prominence in the graphical representation. In such a scenario, alternative paths may be automatically identified as such, and the opportunity may be given to the user to specify which edge should be selected as belonging to the selected path, and thereby aligned with the preceding paths for example as shown in FIG. 6. This selection by the user might comprise a point and click type interaction, for example using the pointer 315 as described above, touching the transition in a touch screen interface, or any other interaction as appropriate to the environment.

Alternatively, the approach may treat edges as the primary entity in the definition of a sequence, and automatically select the nodes called for by the specified transitions. While the forgoing examples concern primarily the manipulation of the representation of a graph, rather than the manipulation of the graph itself, it will be appreciated that the same mechanisms may be used to support modification of the graph, and by extension the code by similar interactions. For example, if the path is determined to define an illegal sequence; the path may be invalidated, or automatically modified to exclude the nodes that fall outside the preferred legal sequence. In an alternative set of embodiments, illegal sequence detection may be interpreted as an instruction to define a new transition so as to make the described path legal. On this basis, code may automatically be generated implementing the described transition. Missing information may be requested from the user by means of an automated dialog so that the transition may be fully defined in the underlying code with a minimum of typing by the user.

While as described above the invention can be applied to any graph, it has particular properties in the context of graphs representing a process flow such as software code.

It will be appreciated that besides the visualisation, debugging and modification actions described above, the environment presenting the code may support any of the operations provided by conventional programming environments. Any of these actions and operations may be initiated and controlled by user interface features such as touch screen, stylus, eye tracking, mouse pointer or other such features as described herein or otherwise.

In particular, users such as programmers are able to visualise the instructions of all transitions that led to the state thanks to the invention. Hence, one can quickly check whether all transitions coming to the "start" state actually unhighlight the graphical shape. In addition, this also allows the programmer to rely on very short-term memory to compare related pieces of code and detect potential flaws. This makes programmers more efficient in understanding the code, at editing it according to a view suitable to their problems at hand, and corresponding shorter development times and more efficient, less error prone software. This in turn advantageously translates into time and energy savings, improved safety and lower system maintenance costs.

It will be appreciated that while the foregoing embodiments present the structure and flow of the code, there may exist other characteristics of the code which are not visible in a Finite State Machine representation. For example, the values of variable may change from state to state, and have an important role in determining the behaviour of the code. This may particularly be the case during debugging, where specific values may be attributed to variable to test behaviour in different scenarios. Accordingly, certain embodiments may encompass the presentation of such additional information in associate with the respective nodes and edges with which they are associated.

In a variant of certain embodiments, any graph may be saved in association with information reflecting the state of the graph at the time of saving. The saved graph can thus constitute a "frozen state". Such information may then be loaded whenever required to jump to a defined state. This state information may comprise a minimal indication of state at the time of saving, or in combination with the considerations presented in the preceding paragraph, may also include variable values associated with the code at the time of saving.

FIGS. 3, 4, 5 and 6 present embodiments of the invention in the form of a particular Graphical User Interface implementation. It will be appreciated that there are countless possible such implementations, of which FIGS. 3, 4, 5 and 6 are merely examples. Furthermore, it will be appreciated that embodiments may also adopt a text based approach, for example in which state selection and/or identification criteria are input via a command line.

The disclosed methods can take form of an entirely hardware embodiment (e.g. FPGA), an entirely software embodiment (for example to control a system according to the invention) or an embodiment containing both hardware and software elements. As such, embodiments may comprise a number of subsystems, functional elements or means adapted to implement the invention in communication with each other, and/or with standard fixed function or programmable elements for example as described below.

Figure 7:
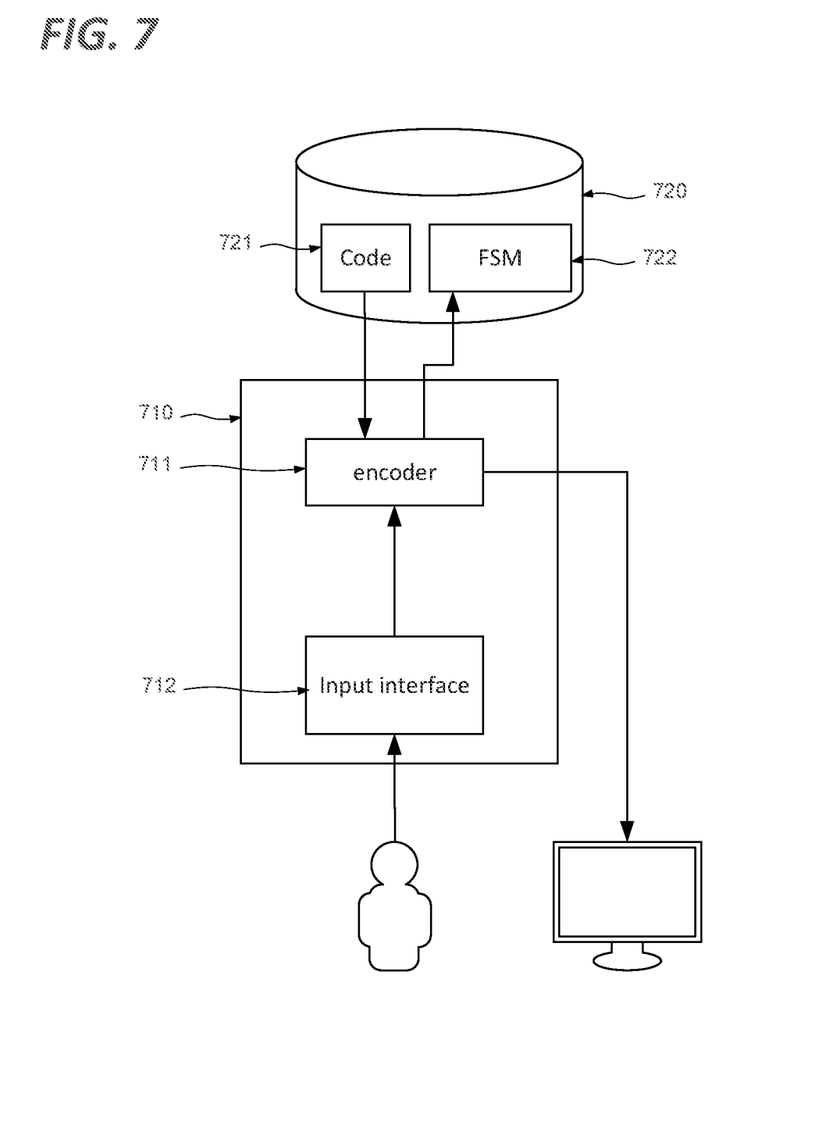
FIG. 7 shows an apparatus in accordance with an embodiment.

FIG. 7 shows an apparatus in accordance with an embodiment. As shown in FIG. 7, there is provided an apparatus 710 for processing code 721. As shown, the code 721 may be located in a database 720. As shown, the apparatus comprises an encoder 711 adapted to generate a representation of the code 721 as a graph 722 and to cause the presentation of a graphical representation of the graph. The apparatus further comprises an input interface 712 adapted to receive user input specifying a sequence through a series of selected nodes of the graph. The encoder 711 is meanwhile further adapted to cause the presentation of a graphical representation of the graph 722 restructured so as to represent each respective selected node such that said selected nodes are arranged in the order corresponding to the sequence responsive to the user input.

Similarly, there is provided an apparatus adapted to perform the steps of any of the methods described above, for example with respect to FIG. 2, or any of the algorithms detailed above and derived algorithms and combinations of them.

In accordance with certain embodiments, there is provided a mechanism for interacting with code such as software source code, whereby the code is represented as a graph such as a finite state machine representation corresponding to the code, such that a user may define a path through the code for example by means of a gesture or cursor movement, and the representation of the graph being restructured to give prominence to the nodes belonging to the defined path, and their sequence as defined in the path. The underlying code associated with each node may be presented with each corresponding node, so that the code of the nodes in the path is aligned, and can be read through as a continuous text. Amendments made to the code as presented can be reintegrated, and the representation adjusted as necessary.

Software embodiments include but are not limited to applications, firmware, resident software, microcode, etc. The invention can take the form of a computer program product accessible from a computer-usable or computer-readable medium providing program code for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, application-programming interface (API), a library, and/or other computer-program product, or any combination of such entities.

The user device may be a mobile device such as a smart phone or tablet, a drone, a computer or any other device with processing capability, such as a robot or other connected device, including IoT (Internet Of Things) devices.

Figure 8:
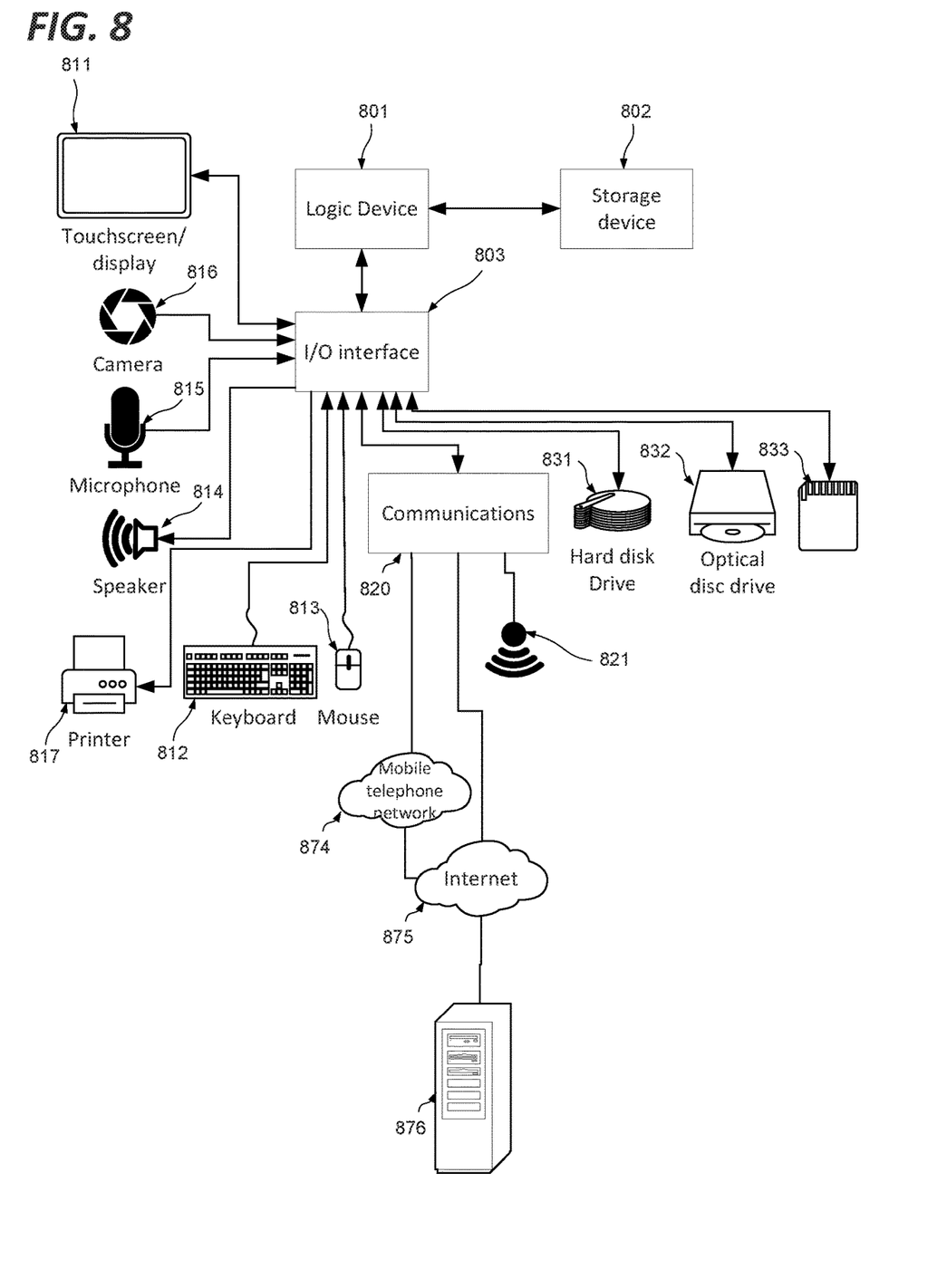
FIG. 8 shows a generic computing system suitable for implementation of embodiments of the invention.

FIG. 8 shows a generic computing system suitable for implementation of embodiments of the invention.

A shown in FIG. 8, a system includes a logic device 801 and a storage device 802. The system may optionally include a display subsystem 811, input/output subsystem 803, communication subsystem 820, and/or other components not shown.

Logic device 801 includes one or more physical devices configured to execute instructions. For example, the logic device 801 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 801 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 801 optionally may be distributed among two or more separate devices, which may be remotely located and/or configured for coordinated processing. Aspects of the logic device 801 may be virtualized and executed by remotely accessible, networked computing devices configured in a cloud-computing configuration.

Storage device 802 includes one or more physical devices configured to hold instructions executable by the logic device to implement the methods and processes described herein. When such methods and processes are implemented, the state of storage 802 device may be transformed—e.g., to hold different data.

Storage device 802 may include removable and/or built-in devices. Storage device may be locally or remotely stored (in a cloud for instance). Storage device 802 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 803 adapted to support communications between the Logic device 801 and further system components. For example, additional system components may comprise removable and/or built-in extended storage devices. Extended storage devices may comprise one or more types of storage device including optical memory 832 (e.g., CD, DVD, HD-DVD, Blu-Ray Disc, etc.), semiconductor memory 833 (e.g., RAM, EPROM, EEPROM, FLASH etc.), and/or magnetic memory 831 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 801 and storage device 802 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device 802. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 8 may be used to implement embodiments of the invention.

For example a program implementing the steps described with respect to FIG. 2, or the algorithms presented above may be stored in storage device 802 and executed by logic device 801. The functions of any or all of the of the units 711 or 712 may similarly be implemented by a program performing the required functions, in communication with additional dedicated hardware units as necessary, and the Code 721 and/or graph 722 may be stored in storage device 802. The display 811 may display the graphical representation of the graph, and/or the path, and may receive the user input defining the path through a touch screen interface, or through the mouse, camera other interface device as described herein. Accordingly the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 811 may be used to present a visual representation of data held by a storage device. This visual representation may take the form of a graphical user interface (GUI). As the herein described methods and processes change the data held by the storage device 802, and thus transform the state of the storage device 802, the state of display subsystem 811 may likewise be transformed to visually represent changes in the underlying data. Display subsystem 811 may include one or more display devices utilizing virtually any type of technology for example as discussed above. Such display devices may be combined with logic device and/or storage device in a shared enclosure, or such display devices may be peripheral display devices. An audio output such as speaker 814 may also be provided.

When included, input subsystem may comprise or interface with one or more user-input devices such as a keyboard 812, mouse 813, touch screen 811, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone 815 for speech and/or voice recognition; an infrared, colour, stereoscopic, and/or depth camera 816 for machine vision and/or gesture recognition; a head tracker, eye tracker, accelerometer, and/or gyroscope for motion detection and/or intent recognition; as well as electric-field sensing componentry for assessing brain activity. The Input/output interface 803 may similarly interface with any other transducer device as may occur to the skilled person. For example, the system may interface with a printer 817.

When included, communication subsystem 820 may be configured to communicatively couple computing system with one or more other computing devices. For example, communication module of communicatively couple computing device to remote service hosted for example on a remote server 876 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 874, or a wired or wireless local- or wide-area network. In some embodiments, the communication subsystem may allow computing system to send and/or receive messages to and/or from other devices via a network such as Internet 875. The communications subsystem may additionally support short range inductive communications with passive or active devices (NFC, RFID, UHF, etc).

The system of FIG. 8 is intended to reflect a broad range of different types of information handling system. It will be appreciated that many of the subsystems and features described with respect to FIG. 8 are not required for implementation of the invention, but are included to reflect possible systems in accordance with the present invention. It will be appreciated that system architectures vary widely, and the relationship between the different sub-systems of FIG. 8 is merely schematic, and is likely to vary in terms of layout and the distribution of roles in systems. It will be appreciated that, in practice, systems are likely to incorporate different subsets of the various features and subsystems described with respect to FIG. 8.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of processing software code susceptible of graphical representation, said method comprising:
    preparing a representation of said software code as a graph,
    presenting a graphical representation of at least a part of said graph,
    receiving user input specifying a sequence through a series of selected nodes of said graph, and adapting said representation of said software code as a graph and said graphical representation of said graph to reflect said sequence; and
    presenting a graphical representation of at least part of said graph restructured to represent each respective said selected node such that said selected nodes are arranged in the order corresponding to said sequence, wherein graphical representation of said graph comprises the representation of the nodes of said graph as discrete entities in a display space, and wherein said user input takes the form of a path through said display space;
    wherein said graph is a finite state machine corresponding to said software code, and each said node is a state of said finite state machine,
    wherein said selected nodes are arranged linearly in the order corresponding to said sequence responsive to said user input and said sequence is taken to comprise all nodes corresponding to a discrete entity lying within a predefined number of pixels of the path, and
    wherein comparing said sequence to the legal sequences of nodes defined in said graph, and adopting whichever legal sequence is the closest match to said specified sequence, and said comparing further comprises determining a distance of each said node in said legal sequence from said path, and adopting as said specified sequence whichever legal sequence implies the smallest average distance from said path.

2. The method of claim 1 further comprising retrieving a text representation of some or all of the nodes selected for display or belonging to said sequence, and displaying said text representation.

3. The method of claim 1 further comprising retrieving the part of said software code corresponding to of some or all of the states selected for display and/or belonging to said sequence, and displaying said software code.

4. The method of claim 1 wherein said sequence additionally specifies one or more transitions of said graph corresponding to selected edges between one or more said selected nodes.

5. An apparatus for processing software code, said apparatus comprising:
    a processor configured to process software code generate a representation of said software code as a graph and to cause the presentation of a graphical representation of said graph,
    an input interface adapted to receive user input specifying a sequence through a series of selected nodes of said graph, and adapting said representation of said software code as a graph and said graphical representation of said graph to reflect said sequence; and
    the processor being further configured, to provide the presentation of a graphical representation of said graph restructured to represent each respective said selected node adjacent another respective said selected node such that said selected nodes are arranged in the order corresponding to said sequence responsive to said user input, wherein graphical representation of said graph comprises the representation of the nodes of said graph as discrete entities in a display space, and wherein said user input takes the form of a path through said display space;

wherein said graph is a finite state machine corresponding to said software code, and each said node is a state of said finite state machine;

wherein said selected nodes are arranged linearly in the order corresponding to said sequence responsive to said user input and said sequence is taken to comprise all nodes corresponding to a discrete entity lying within a predefined number of pixels of the path; and wherein comparing said sequence to the legal sequences of nodes defined in said graph, and adopting whichever legal sequence is the closest match to said specified sequence, and said comparing further comprises determining a distance of each said node in said legal sequence from said path, and adopting as said specified sequence whichever legal sequence implies the smallest average distance from said path.

6. A non-transitory computer storage medium having stored computing instructions, that when executed by a processor of a computing device, cause the computing device to process software code:

preparing a representation of said software code as a graph, presenting a graphical representation of at least a part of said graph, receiving user input specifying a sequence through a series of selected nodes of said graph, and adapting said representation of said software code as a graph and said graphical representation of said graph to reflect said sequence; and presenting a graphical representation of at least part of said graph restructured to represent each respective said selected node such that said selected nodes are arranged in the order corresponding to said sequence; wherein graphical representation of said graph comprises the representation of the nodes of said graph as discrete entities in a display space, and wherein said user input takes the form of a path through said display space;

wherein said graph is a finite state machine corresponding to said software code, and each said node is a state of said finite state machine, wherein said selected nodes are arranged linearly in the order corresponding to said sequence responsive to said user input and said sequence is taken to comprise all nodes corresponding to a discrete entity lying within a predefined number of pixels of the path, and wherein comparing said sequence to the legal sequences of nodes defined in said graph, and adopting whichever legal sequence is the closest match to said specified sequence, and said comparing further comprises determining a distance of each said node in said legal sequence from said path, and adopting as said specified sequence whichever legal sequence implies the smallest average distance from said path.

\* \* \* \* \*